June 26, 1951  O. P. GRAFF  2,558,355

AUTOMATIC SAFETY VALVE FOR OIL BURNERS

Filed March 22, 1947

INVENTOR.
Ole Pedersen Graff
BY
Luther M Hawley
Attorney

Patented June 26, 1951

2,558,355

UNITED STATES PATENT OFFICE 2,558,355

AUTOMATIC SAFETY VALVE FOR OIL BURNERS

Ole Pedersen Graff, Baltimore, Md.

Application March 22, 1947, Serial No. 736,471

1 Claim. (Cl. 299—150)

This invention relates to fuel oil burners and particularly to automatic valve mechanism therefor.

Many serious injuries have been caused by fires or boiling hot fuel oil in oil burning plants because of failure to shut off the oil supply during repair or replacement of the oil atomizers.

This invention has for its salient object to provide an improved, simple and practical, automatically operable valve for the supply line of oil burners, so constructed and arranged that the valve will be automatically closed to shut off the oil supply when the atomizer is removed and will be automatically opened when the atomizer is replaced.

Further objects of the invention will appear from the following specification taken in connection with the drawings which form a part of this application, and in which Fig. 1 is an elevational view showing the valve closed;

Figure 1:
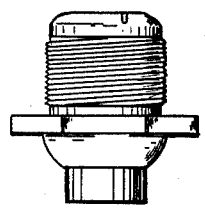
Figure 2:
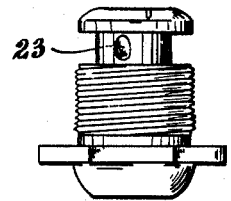
Fig. 2 is a view similar to Fig. 1 but showing the valve in open position.
Figure 3:
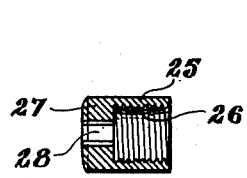
Figs. 3, 4 and 5 are sectional elevations separately showing the three operative parts of the valve.
Figure 4:
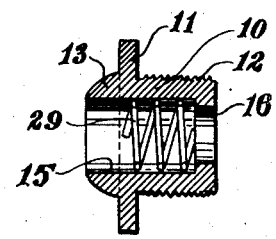
Figure 5:
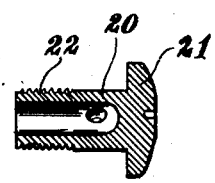

In the particular embodiment of the invention illustrated, the valve unit, as shown in Figs. 1 to 5 inclusive, comprises a valve body or casing 10 having a flanged nut 11 formed thereon and a threaded outer surface 12 at one side of the nut 11 and a dome-shaped head or end 13 at the other side of the nut. The body 10 has a central bore 15, at one end of which is formed a flange 16.

A sleeve 20 having a head 21 at one end and an externally threaded portion 22 at the other end is slidably mounted in the flange 16. The wall of the sleeve has a plurality of openings 23 adjacent the head 21.

A cup-shaped thimble 25 has internal threads 26 at one end adapted to be threaded on the end 22 of the sleeve 20, and has an end 27 provided with a central opening 28. The thimble 25 is dimensioned to slide in the bore 15 of the valve casing.

A spring 29 is positioned in the bore 15 and engages the flange 16 at one end and the end of the thimble 25 at the other end.

The spring 29 functions to maintain the head 21 against the end of the valve body or casing 10, as shown in Fig. 1, when there is nothing engaging the end of the thimble to push it in and open the valve.

Figure 6:
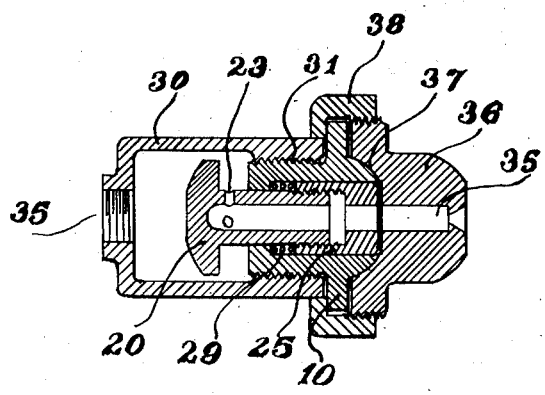
Fig. 6 is a sectional elevation showing the valve mounted in the atomizer clamp and the atomizer unit clamped thereto.

Fig. 6 illustrates the use of the valve. In this view there is shown an atomizer clamp 30 having a threaded bore 31 leading to the oil burner. The threaded portion 12 of the valve is screwed into the bore 31. The fuel supply and atomizer pipe are shown at 35. The portion 36 has a dome-shaped outlet end 37. This end is placed over the dome-shaped end 13 of the valve and when the atomizer is clamped in place by the clamp 38, the thimble 25 is forced into the valve body 10 against the action of spring 29, thus forcing the sleeve 20 to the position shown in Fig. 2, exposing the openings 23 and permitting the oil to pass through the valve.

When the atomizer unit is removed from the clamp, the valve is automatically closed by the spring 29.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claim.

What I claim is:

In combination, an automatically operable valve for an oil burner oil supply line having an atomizer at one end, said valve comprising a valve body member having a central bore at one end of which is an inwardly projecting annular flange defining a reduced bore portion and an annular shoulder, a cup-shaped thimble slidably mounted in the valve body member bore and itself provided with a threaded central bore terminating in a reduced, unthreaded passageway in its otherwise closed end, a tubular sleeve extending through said reduced bore portion and having an exteriorly threaded end in engagement with the threaded bore of said thimble, said sleeve being transversely apertured at its other end and terminating in an enlarged head and a helical spring encircling said sleeve within said valve body bore between the end of said thimble and said inwardly projecting annular flange, the bore of the sleeve and the unthreaded passageway in the thimble being aligned and in communication, an annular flanged nut projecting from said valve body member the outer surface of which is threaded rearwardly of said flange, an atomizer clamp body in threaded engagement with said valve body member and having a chamber within which the head of said sleeve is received, a fuel supply and atomizer pipe associated with said valve body member and having an end flange which is exteriorly threaded and a threaded clamp around said flanged nut and end flange and threadedly engaging said end flange for holding said pipe in operative position with respect to said valve, said pipe having an opening therein in alignment and communication with the sleeve bore and thimble passageway aforesaid.

OLE PEDERSEN GRAFF.

REFERENCES CITED

The following references are of record in the file of this patent:

UNITED STATES PATENTS

| Number | Name | Date |
| --- | --- | --- |
| 529,221 | Wagner | Nov. 13, 1894 |
| 623,128 | Bartlett | Apr. 18, 1899 |
| 1,017,654 | DeGrey | Feb. 20, 1912 |
| 1,580,828 | Harvey | Apr. 13, 1926 |
| 2,322,877 | Parker | June 29, 1943 |

FOREIGN PATENTS

| Number | Country | Date |
| --- | --- | --- |
| 10,904 | Great Britain | May 10, 1907 |